United States Patent [19]

Gallop

[11] 4,401,797

[45] Aug. 30, 1983

[54] COPOLYMERS AND HYDROGELS: PROCESS AND ARTICLES MADE THEREOF

[75] Inventor: Paul M. Gallop, Chestnut Hill, Mass.

[73] Assignee: Syntex (U.S.A.) Inc., Palo Alto, Calif.

[21] Appl. No.: 265,304

[22] Filed: May 20, 1981

[51] Int. Cl.³ .................... C08F 220/12; C08F 220/20
[52] U.S. Cl. ............................... 525/383; 351/160 R; 351/160 H; 523/106; 525/384; 525/387; 526/75; 526/239; 526/266; 526/269; 526/270; 526/273; 526/301; 526/309; 526/314; 526/320
[58] Field of Search ................ 526/75, 239, 266, 269, 526/270, 273, 301, 309, 314, 317, 320; 525/329, 383, 384, 387; 260/29.6 H, 29.6 CM, 29.6 AT; 523/106

[56] References Cited

U.S. PATENT DOCUMENTS

| 2,680,735 | 6/1954 | Fegley et al. | 526/270 |
| 2,877,215 | 3/1959 | Fang | 526/270 |
| 2,967,173 | 1/1961 | Fang | 526/269 |
| 2,979,514 | 4/1961 | O'Brien et al. | 526/270 |
| 4,056,496 | 11/1971 | Mancini et al. | 526/320 |

*Primary Examiner*—Harry Wong, Jr.
*Attorney, Agent, or Firm*—Howard M. Peters; Joseph I. Hirsch

[57] ABSTRACT

Copolymers having improved machining and water resistant properties are produced using a monomer containing an adduct protecting group, particularly an alkyl boronic acid adduct, of glyceryl acrylate or glyceryl methacrylate, in combination with an alkyl acrylate or methacrylate, and optionally a glycidyl acrylate or methacrylate. After machining and shaping, the adduct is removed to provide a hydrogel useful as a contact lens material.

14 Claims, No Drawings

COPOLYMERS AND HYDROGELS: PROCESS AND ARTICLES MADE THEREOF

BACKGROUND

1. Field of the Invention

This invention relates generally to copolymers having improved physical and chemical properties which are produced using a protecting group (adduct), particularly an alkyl boronic acid adduct of glyceryl methacrylate or glyceryl acrylate, in combination with an alkyl acrylate or alkyl methacrylate, and optionally using a crosslinking agent such as a glycidyl acrylate glycidyl methacrylate, polyol diacrylate or polyol dimethacrylate. The copolymer has improved handling, machining and shaping properties with respect to water sensitivity in comparison with related materials. Removal of the adduct, as by treatment with hot water or hydrogen peroxide buffer, produces a hydrogel which is useful as a contact lens material.

2. Prior Art

While glass contact lenses were used to correct vision problems in the early 1900's, widespread use and development of the contact lens field did not occur until the advent of organic polymer chemistry during and after World War II. During this period hard contact lenses were usually made from the polymer, polymethylmethacrylate. Some problems encountered with the use of this polymer as a contact lens material include:

(1) inability of many people to adapt to the presence of a hard lens in the eye;
(2) small particles lodged under the lens cause irritation of the cornea;
(3) after one to five years of use, many people experience discomfort and discontinue use; and
(4) impermeability of the polymer to physiological agents, such as oxygen and carbon dioxide necessary for corneal metabolism.

This last property causes "oxygen starvation" which produces "corneal edema," a serious eye condition which is usually reversible by discontinuing use of the hard contact lens.

In view of the above difficulties, efforts were made to develop new materials which overcome the problems of the hard lens. One class of such lens materials are hydrogels of sparingly cross-linked hydrophilic comonomers, and unsaturated organic acids and diacids, described for example in U.S. Pat. Nos. 2,976,576 and 3,220,960. A specific hydrogel disclosed in these patents is a slightly crosslinked material comprising a major amount of 2-hydroxyethyl methacrylate. This hydrogel has become widely known in the art as "HEMA" and is particularly useful because of its ability to absorb about 35 to 45 percent by weight of water. The water renders the lens permeable to oxygen, and also soft and flexible so as to enable it to conform to the curvature of the eye.

In spite of its obvious advantages, the HEMA lens presented some additional problems, including:

(1) a lack of clarity of central vision because of a constantly changing optical surface resulting from normal eye movement and blinking;
(2) a lack of a sufficiently rigid, non-deforming surface which would correct astigmatism;
(3) corneal irritation possibly caused by a lack of tear exchange because the tight lens conformation to the eye prevents flow at the edge of the lens;
(4) an accumulation of catabolic products; and
(5) a lack of structural stability.

Additional polymers and manufacturing techiques to improve the overall properties of contact lenses are disclosed in U.S. Pat. Nos. 3,361,858; 3,542,097; 3,647,736; 3,700,761; 3,728,315; 3,926,892; 4,045,547; 4,095,877; 4,109,070; and 4,113,686.

A new contact lens material has been reported to overcome the problems described above and is disclosed in U.S. Pat. No. 4,056,496, which is incorporated herein by reference. These materials are hydrogels formed from a dihydroxyalkyl acrylate or methacrylate, an alkyl acrylate or methacrylate and optionally a minor amount of an epoxidized alkyl acrylate or methacrylate. The properties of these hydrogels when compared to HEMA are:

(1) stronger and stiffer;
(2) capable of being fabricated of a thinner cross-section;
(3) capable of providing increased pumping action of tears caused by blinking;
(4) substantial oxygen and carbon dioxide permeability needed for normal corneal metabolism;
(5) extended wear—in some cases up to six months;
(6) improved ability to be cleaned; and
(7) a toughness which prevents tearing.

The polymers described in U.S. Pat. No. 4,056,496 on occasion were found to present problems during shaping and machining, probably due to the polymer's ability to absorb water from the atmosphere. Careful control of the humidity during machining was found to be necessary. Further, water based or compatible machining and polishing oils and abrasives could not be used because of their incompatibility with the polymer. Finally, polymers of this type often become seriously distorted after machining when they absorb water necessary to be useful as contact lens materials. Correction of this lens distortion is expensive, time-consuming, and sometimes impossible (resulting in the total loss of previously manufactured polymer material).

It would, therefore, be useful to have a polymeric material which could be easily machined using water based and compatible oils, polishes and abrasives without regard to humidity. This polymer could subsequently be treated to produce a hydrogel material having the desired properties, e.g., minimal distortion, for use as a contact lens material.

SUMMARY OF THE INVENTION

This invention describes a copolymer formulation and method of manufacture to produce a polymeric material which has improved machinability, and resistance to water. When the polymer is treated subsequently with aqueous chemical agents, a hydrogel is produced having the desired characteristics for use as a contact lens. It is of particular significance that the polymer material can be machined with water based agents to the desired shape, then treated to form a hydrogel material which has the desired contact lens properties.

The copolymers hereof include a first monomer which is a hydrophilic monomer selected from the group of dihydroxyalkyl acrylates and methacrylates in which the dihydroxyl groups of the alkyl portion have been chemically treated to form a protecting group (adduct). The adduct is further purified by certain separation techniques including, treatment with aprotic non-hydroxylic solvents.

The second monomer is a substantially water insoluble monomer selected from the group consisting of alkyl acrylates and alkyl methacrylates.

The copolymer may optionally include a third monomer consisting of an epoxidized alkyl acrylate or epoxidized alkyl methacrylate. The copolymer may optionally also include a third monomer which is a polyol diacrylate or polyol dimethacrylate.

The copolymer is formed by a free radical, bulk polymerization in the substantial absence of solvent. After formation the copolymer can be easily machined and shaped in the presence of water and humidity using water-based and water compatible oils, polishes and abrasives known in the art. After shaping, the copolymer is treated, for example with water or hydrogen peroxide in a buffer solution, to remove the adduct to thereby obtain a hydrogel material having the desired contact lens properties.

Specifically, this invention concerns a polymer formed by a free radical bulk polymerization of:

$$CH_2=\underset{\underset{R_1}{|}}{C}-\underset{\underset{}{\overset{O}{\|}}}{C}-O(CH_2)_m-\underset{\underset{}{\overset{X}{\underset{O}{|}}}}{CH}(CH_2)_n\underset{\underset{}{\overset{Y}{\underset{O}{|}}}}{CH_2}$$

wherein:
$R_1$ is hydrogen or methyl;
m is an integer from 1 to 4;
n is an integer from 0 to 1;
X and Y are independently selected from the group consisting of:
(1) —C(O)OR$_2$ (alkyl carbonate)
  where $R_2$ is an alkyl group containing from 1 to 8 carbon atoms;
(2) hexahydropyranyl;
(3) where X and Y together form one protecting group selected from the group consisting of
  (i) >B-R$_3$ (borate)
  wherein: $R_3$ is a lower alkyl group containing 1 to 6 carbon atoms, cycloalkyl group containing 3 to 6 carbon atoms, and aryl selected from the group consisting of phenyl, tolyl, and naphthyl;

$$\underset{}{\overset{R_4}{\diagdown}}\underset{}{\overset{}{\underset{R_5}{\diagup}}}C \quad \text{(ketal)} \qquad (ii)$$

wherein: $R_4$ and $R_5$ are independently selected from hydrogen and lower alkyl groups containing 1 to 6 carbon atoms, or together may form a cyclic ring containing from 2 to 6 carbon atoms;
(iii) >C=O (carbonate)
(iv) >CHR$_6$ (acetal)
wherein:
$R_6$ is a lower alkyl group containing from 1 to 6 carbon atoms; and
(v) >S=O (sulfite)
(b) a second substantially water insoluble monomer of the formula:

$$CH_2=\underset{\underset{R_7}{|}}{C}-\overset{O}{\overset{\|}{C}}-OR_8$$

wherein:

$R_7$ is hydrogen or methyl; and
$R_8$ is lower alkyl having 1 to 6 carbon atoms or cycloalkyl having from 3 to 6 carbon atoms;
the molar ratio of said first monomer to said second monomer being between about 1:30 and 20:1; and
(c) optionally, a third substantially water insoluble monomer of the formula:

$$CH_2=\underset{\underset{R_9}{|}}{C}-\overset{O}{\overset{\|}{C}}-O(CH_2)_p-\underset{}{\overset{O}{\overset{\diagup\diagdown}{CH-CH_2}}} \qquad (i)$$

wherein:
$R_9$ is hydrogen or methyl; and
p is an integer from 1 to 6; the concentration of said third monomer when present being between about 0 and 30 percent by weight of the first monomer.
More specifically, said polymer includes as
(a) first monomer a compound of the formula:

$$CH_2=\underset{\underset{R_1}{|}}{C}-\overset{O}{\overset{\|}{C}}-O(CH_2)_m-\underset{\underset{\underset{}{|}}{O}}{CH}(CH_2)_n\underset{\underset{\underset{}{|}}{O}}{CH_2} \quad \overset{R_3}{\underset{}{\overset{|}{B}}} $$

wherein:
B is a boron atom;
$R_1$ is hydrogen or methyl;
$R_3$ is lower alkyl containing 1 to 6 carbon atoms or cycloalkyl having 3 to 6 carbon atoms or aryl selected from the group consisting of phenyl, tolyl and naphthyl; m is an integer from 1 to 4; and n is an integer from 0 to 1; and the second and third monomers are defined above.

The first monomer described herein may be prepared by treatment of the dihydroxyalkyl acrylate or methacrylate of the formula $$CH_2=\underset{\underset{R_1}{|}}{C}-\overset{O}{\overset{\|}{C}}-O(CH_2)_m-\underset{\underset{OH}{|}}{CH}(CH_2)_n\underset{\underset{OH}{|}}{CH_2}$$

wherein: $R_1$, m and n are as defined above, with a suitable compound(s) to obtain protection of both of the adjacent hydroxyl groups by formation of a five-or six-membered ring structure.

Such compounds and the protecting groups formed therefrom are shown in the following table, wherein $R_2$, $R_3$, $R_4$, $R_5$ and $R_6$ are as defined above and n is zero.

| Compound Name/Structure | Protecting Group Adduct | |
|---|---|---|
| | Name | Structure |
| Acetone/CH$_3$$\overset{O}{\overset{\|}{C}}$CH$_3$ | Isopropylidine | $\underset{}{\overset{CH_3}{\diagdown}}\underset{}{\overset{}{\underset{CH_3}{\diagup}}}C$ $\underset{-CH-CH_2}{\overset{O \quad O}{\underset{\| \quad \|}{}}}$ |
| Ketone/R$_4$$\overset{O}{\overset{\|}{C}}$R$_5$ | Ketal | $\underset{}{\overset{R_4}{\diagdown}}\underset{}{\overset{}{\underset{R_5}{\diagup}}}C$ $\underset{-CH-CH_2}{\overset{O \quad O}{\underset{\| \quad \|}{}}}$ |

| Compound Name/Structure | Protecting Group Adduct | |
|---|---|---|
| | Name | Structure |
| Carbonyl Chloride/ COCl$_2$ | Cyclic Carbonate | ![structure]<br>O=C(O-)(O-)<br>—CH(CH$_2$)$_n$CH$_2$— |
| Aldehyde<br>$R_6$CHO | Acetal | R$_6$, H on C, O-O<br>—CH——CH$_2$— |
| Thionyl chloride/ SOCl$_2$ | Cyclic sulfite | O=S(O-)(O-)<br>—CH——CH$_2$— |
| Tetrahydropyran/ | Tetrahydropyranylether | (two pyran rings attached via O)<br>—CH——CH$_2$ |
| Alkylchloroformate/<br>ClCOR$_2$ | Alkyl carbonate | R$_2$O—C(=O)—O—...—O—C(=O)—OR$_2$<br>—CH—CH$_2$— |
| Alkyl or aryl boronic acid/ R$_3$—B(OH)$_2$ | Alkyl or aryl boronic acid adduct | R$_3$—B(O-)(O-)<br>—CH——CH$_2$— |
| Alkyl or aryl boronic halide/ R$_3$—BX$_2$ | Alkyl or aryl boronic acid adduct | R$_3$—B(O-)(O-)<br>—CH——CH$_2$— |
| Dialkyl Carbonylchloride R$_2$R$_2$N—C(O)Cl | Dialkyl Urethane | R$_2$,R$_2$N—C(=O)—O—CH—...—CH—O—C(=O)—NR$_2$R$_2$ |

Analogous structures are produced when n is 1. The use of certain of such compounds to protect hydroxyl groups in steroid chemistry has been discussed by Carl Djerassi, in "Steroid Reactions," published by Holden-Day, Inc., in 1963, pages 67–88. The preparation of protected acrylates and methacrylates is also discussed in U.S. Pat. No. 2,680,735 and British Pat. Nos. 690,709 and 852,384.

Preferably, the compound used to form the protecting group (adduct) is the alkyl or aryl boronic acid because of its ease of addition and later removal under mild conditions, such as heating in water, treatment with dihydroxyl alkanes in water with heating, treatment with dilute hydrogen peroxide in a buffer solution at ambient temperature, and treatment with a sodium perborate solution. More preferably, the compounds used to protect the adjacent hydroxyl groups are alkyl boric acids, including:

methyl boronic acid
ethyl boronic acid
n-propyl boronic acid
isopropyl boronic acid
n-butyl boronic acid
isobutyl boronic acid
sec-butyl boronic acid
cyclobutyl boronic acid
n-pentyl boronic acid
isopentyl boronic acid
neopentyl boronic acid
cyclopentyl boronic acid
n-hexyl boronic acid
isohexyl boronic acid and
cyclohexyl boronic acid,
phenyl boronic acid,
o-, m-, or p-tolyl boronic acid,
naphthalyl boronic acid, and mixtures thereof.

The preferred protecting agent at this time, the compound used to protect the hydroxyl groups is butyl boronic acid.

The dihydroxy adduct of the formula:

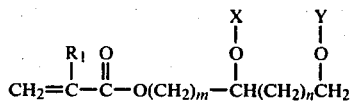

wherein: $R_1$, X, Y, m and n are as described above, is subsequently treated with an aprotic nonhydroxylic solvent. The adduct is soluble in said solvent or mixtures of solvents whereas impurities, such as the unreacted or partially reacted dihydroxy compounds, are insoluble and may be separated by standard techniques, such as extraction and crystallization. The solvent is then removed by evaporation and the purified adduct is ready for copolymerization. Aprotic, nonhydroxylic solvents useful in this separation step include the following:

n-pentane
cyclopentane
n-hexane
cyclohexane
n-heptane
cycloheptane
n-octane
cyclooctane
isooctane
diethyl ether
mineral spirits and those other solvents and mixtures of solvents known in the art to be useful to separate polar compounds from nonpolar compounds. The presently preferred solvents are n-pentane and n-hexane.

The purified alkyl boronic acid adduct of glyceryl methacrylate has been observed to autopolymerize at room temperature. This monomer should be mixed and polymerized immediately after preparation or stabilized using organic amines, such as cyclohexylamine, and retained in the cold.

The second monomer which is substantially insoluble in water is of the formula:

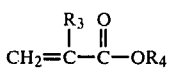

wherein: $R_3$ and $R_4$ are as set forth above. The molar ratio of said first monomer to said second monomer is between 1:30 and 20:1. Preferably, the molar ratio of said first monomer to said second monomer is between 1:1 and 10:1. More preferably, the molar ratio of said first monomer to said second monomer is between 1.2:1 and 2:1.

The optional third substantially water insoluble monomer is of the formula:

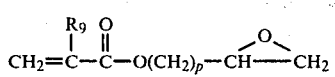

wherein: $R_9$ and p are as set forth above. The concentration of this optional third monomer when present by addition may vary between 0.001 and 30% by weight of the first monomer. Preferably, this optional third monomer is glycidyl methacrylate wherein $R_9$ is methyl and n is 1.

Alternatively, the optional third monomer when present is a substantially insoluble polyol diacrylate or dimethacrylate of the formula:

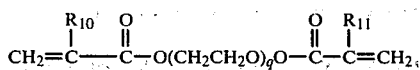

wherein: $R_{10}$ and $R_{11}$ are independently selected from methyl and hydrogen; and q is an integer from 1 to 6. The concentration of this alternative third monomer when present may vary between 0.001 and 30% by weight of the first monomer. Preferably, the third monomer is tetraethyleneglycoldimethacrylate, wherein $R_{10}$ and $R_{11}$ are methyl and q is 4, or ethyleneglycoldimethacrylate, wherein $R_{10}$ and $R_{11}$ are methyl and q is 1.

Additional third monomers which may be used to achieve the desired properties include, but are not limited to the following:

Methacrylic acid,
N-Vinyl-2-pyrrolidone,
Hydroxyalkyl esters of acrylic acid,
Hydroxyalkyl esters of methacrylic acid, and
Trimethylolpropane.

The first, second, and third monomers are combined and bulk polymerized using a free radical catalyst. Such free radical catalysts are well known in the art and include the following:

azobisisobutyrylnitrile (AIBN)
tert-butyl peroxypivalate
tert-butyl peroxydecanoate
tert-butyl perbenzoate
isopropyl peroxydicarbonate
acetoxy peroxide
benzoyl peroxide
2,5-dimethyl-2,5-bis(2-ethyl hexoyl peroxy)hexane
cyclohexanone peroxide
di-sec-butyl peroxydicarbonate and the like. A presently preferred catalyst is azobisisobutyrylnitrile. The catalyst is present in amounts effective to achieve the desired degree of polymerization. Concentrations which have proved useful are between 0.001 and 1 percent by weight of the first monomer.

The polymer thus obtained is hard and resistant to water in comparison to HEMA and similar non-protected hydrogel polymers. It may be handled, machined and shaped in an atmosphere without special precautions to remove humidity. Further, it may be machined and shaped using water based and water compatible oils, polishes and abrasives. Lens polishing compounds such as EXPAL, which is a finely ground aluminum oxide powder available from the W. R. Grace Co., Inc. may be used, with these polymers in a water solution. Other finely ground metal or metal oxide powders in water are also useful.

The copolymer thus prepared by this free radical polymerization before, or preferably after machining and shaping, may be further treated with water and dilute acid to remove the protecting group and generate the hydroxyl groups. Specific methods to regenerate the hydroxyl groups are described in *Steroid Reactions* by Djerassi as described above and references cited therein. Preferably, the protecting group is an alkyl boronic acid which typically requires mild reaction conditions for removal, thus, the polymer structure is essentially not affected.

The copolymer prepared by the free radical polymerization process, before, or preferably after machining, and shaping, also may be treated with a dihydroxyalkane and water with boiling to remove the boronic protecting group and produce the hydrogel.

Alternatively, the boron protecting group may be removed by treatment with dilute hydrogen peroxide in a buffer solution. Preferably, the concentration of the hydrogen peroxide is between 0.1 and 20% by weight of the buffer solution. More preferably, the hydrogen peroxide concentration is about 10%.

Typically, the reaction is run between 0° C. and 100° C. at ambient conditions (about 20° C. at standard atmospheric pressure).

Alternatively, a 10% sodium perborate solution may be used to replace hydrogen peroxide in the aforementioned treatment to remove the boron protecting group.

The polymer thus obtained by removal of the protecting group will have a linear expansion of about 5–20 percent and more likely 6–12%, when it is hydrated to become a hydrogel. The water of hydration of the hydrogel will be between about 20 to 45 percent by weight.

DESCRIPTION OF SPECIFIC EMBODIMENTS

The following description is given to enable those skilled in this art to more clearly understand and practice the present invention. It should not be considered as a limitation upon the scope of the invention but merely as being illustrative and representative thereof.

EXAMPLES 1–4

The compounds shown in the following table are used to protect the hydroxyl groups. The following general synthetic procedure is used.

Anhydrous Compound A (about 1.1 moles) is treated with about 160 grams (g) of dried glyceryl methacrylate (about 1 mole) in an ice bath without solvent in a nitrogen atmosphere. The reaction occurs over two hours after which the water produced is either removed by azeotropic distillation with toluene (Example 1), or by using 20–30 g of anhydrous sodium sulfate (Example 3). In Examples 2 and 4 pyridine, about 2 equivalents, is used to react with the hydrogen chloride which is generated. The toluene is removed using reduced temperature and pressure, about 100 milliliters (ml) of hexane is added, and the product is filtered. The residue is washed twice with 20 ml of hexane, filtered and combined with the hexane extracts. The reaction mixture is kept cold and under nitrogen. The hexane solution is evaporated under vacuum to produce the adduct product.

| | Compound A | | Product W is $CH_2=C(CH_3)-C(O)OCH_2-$ | |
|---|---|---|---|---|
| Example | Structure | (g) | Structure | (g) |
| 1 | $CH_3C(O)CH_3{}^a$ | 64 | $\begin{array}{c}CH_3\phantom{XX}CH_3\\ \diagdown\phantom{X}\diagup\\ O\phantom{XX}O\\ |\phantom{XX}|\\ W-CH-\!\!-\!\!-CH_2\end{array}$ | 150 |
| 2 | $COCl_2{}^b$ | 110 | $\begin{array}{c}O\\ \|\\ C\\ \diagup\phantom{X}\diagdown\\ O\phantom{XX}O\\ |\phantom{XX}|\\ W-CH-\!\!-\!\!-CH_2\end{array}$ | 157 |
| 3 | $HC(OC_2H_5)_3{}^a$ | 135 | $\begin{array}{c}H\phantom{XX}C_2H_5\\ \diagdown\phantom{X}\diagup\\ C\\ \diagup\phantom{X}\diagdown\\ O\phantom{XX}O\\ |\phantom{XX}|\\ W-CH-\!\!-\!\!-CH_2\end{array}$ | 160 |
| 4 | $SOCl_2$ | 132 | $\begin{array}{c}O\\ \|\\ S\\ \diagup\phantom{X}\diagdown\\ O\phantom{XX}O\\ |\phantom{XX}|\\ W-CH-\!\!-\!\!-CH_2\end{array}$ | 159 |

[a] 0.5 percent by weight of anhydrous sulfuric acid is used as a catalyst.
[b] as a gas Sixty grams of the adduct is then combined with 40 g of methyl methacrylate and 0.50 g of tert-butyl peroxy pivalate as catalyst in a glass tube at 70° C. for 3 hr. The resulting polymers are hard and water resistant as compared to HEMA. After machining and shaping each polymer in the form of a contact lens in a humid environment, each lens is treated with a 1% solution of hydrochloric acid at room temperature for 24 hours and then at 50° C. for 2 hours. Each polymer is examined for percent elongation and for percent of water of hydration. The results are shown in the following table:

| | Precursor Compound to Produce | Hydrogel | |
|---|---|---|---|
| Example | Protecting Group | % Elongation | % Water |
| 1 | $CH_3C(O)CH_3$ | 10 | 37 |
| 2 | $SOCl_2$ | 8 | 21 |
| 3 | $HC(OC_2H_5)_3$ | 12 | 44 |
| 4 | $SOCl_2$ | 9 | 30 |

These materials are colorless or slightly yellow and are useful as contact lens materials.

EXAMPLE 5

To a 250 ml round bottom flask cooled to 0° C. using an ice bath is added 33.8 g of glyceryl methacrylate (0.211 moles, from commercial sources) which was previously dried using anhydrous sodium sulfate. Without solvent and under a nitrogen atmosphere, 25.0 g of n-butyl boronic acid (0.245 moles, from commercial sources) is added. After mixing, 0.05 ml of commercial cyclohexyl amine is added as a stabilizer. The reaction mixture is stirred for 30 minutes during which time about 20 g of sodium sulfate is added in three portions. All subsequent steps are performed cold and under a nitrogen atmosphere. Excess hexane (about 100 ml) is added and the hexane extract is filtered. The residue is washed twice with 20-ml of hexane, filtered and added to the initial hexane extract and filtered twice more. The hexane solution is removed under vacuum to produce 47.0 g of the butyl boronic acid adduct of glyceryl methacrylate, about 98% of the theoretical yield. As a stabilizer, 0.05 ml of additional cyclohexylamine is added to the product.

EXAMPLE 6A

A polymerization mixture of 34.6 g of the butyl boronic acid adduct of glyceryl methacrylate of Example 5, 10.1 g of methylmethacrylate and 0.044 g of azobisisobutyrylnitrile (AIBN) as catalyst are combined.

A 32.1 g portion of the polymerization mixture is put in a polyethylene mold and heated at 70°–75° C. for one hour and then retained at room temperature overnight (about 16–20 hr). A colorless polymer rod is obtained. The rod is cut into buttons which are easily cut into the shape of a contact lens using standard techniques. The lenses are treated overnight with about 100 ml of 10% hydrogen peroxide in a sodium bicarbonate buffer solution (about pH 9). These lenses are further hydrated in saline solution to complete the formation of the hydrogel. These hydrogel lenses are useful as contact lenses.

EXAMPLE 6B

A 12.6 gram portion of the polymerization mixture prepared in Example 6 is placed in a polypropylene test tube for 36 hours at room temperature, then heated at 60° C. for four hours. A polymer rod is obtained from which lenses could be easily shaped under humid conditions. The lens is treated with 10% hydrogen peroxide in a sodium bicarbonate buffer solution overnight to obtain the hydrogel useful as a contact lens material.

EXAMPLE 6C

The lens prepared in Example 6B is further hydrated in saline solution to obtain the hydrogel. The polymeric hydrogel is useful as a contact lens material.

EXAMPLES 7–21

The butyl boronic acid adduct is prepared according to Example 5. Abbreviations for the components used to prepare the polymer are butyl boronic acid adduct of glyceryl methacrylate, BBA-GMA; and methyl methacrylate, MMA. The percentages of each component are shown in the following table:

| Example | BBA—GMA Weight Percent | MMA Weight Percent | Crosslinking Agent Weight Percent | Hydration % $H_2O$ |
|---|---|---|---|---|
| 7 | 100 | — | — | a |
| 8 | 80 | 20 | — | |
| 9 | 60 | 40 | — | 44 |
| 10 | 50 | 50 | — | 36 |

-continued

| Example | BBA—GMA Weight Percent | MMA Weight Percent | Crosslinking Agent Weight Percent | Hydration % H$_2$O |
|---|---|---|---|---|
| 11 | 40 | 60 | — | 24 |
| 12 | 30 | 70 | — | — |
| 13 | 80 | 10 | 10[b] | — |
| 14 | 69 | 29 | 2[b] | — |
| 15 | 69 | 29 | 2[c] | — |
| 16 | 59 | 39 | 2[b] | — |
| 17 | 59 | 39 | 2[c] | — |
| 18 | 49 | 49 | 2[b] | — |
| 19 | 49 | 49 | 2[c] | — |
| 20 | 39 | 59 | 2[b] | — |
| 21 | 39 | 59 | 2[c] | — |
| 22 | 10 | 80 | 10[b] | — |

[a]Not useful as a contact lens material
[b]Diethyleneglycol dimethacrylate
[c]Tetraethyleneglycol dimethacrylate The components shown above are combined according to the procedure described in Example 5. The clear polymers obtained are not particularly sensitive to humidity and are cut using water based and compatible oils, polishes, and abrasives. The lenses obtained were then treated by one of the following methods to remove the butyl boronic acid adduct, produce the hydroxyl groups, and partially or completely hydrate the polymer:

Sodium perborate—The lenses are treated with a solution of 10% sodium perborate for about 24 hours at room temperature;

Hydrogen Peroxide—The lenses are treated with 10% hydrogen peroxide in a sodium bicarbonate buffer solution (about pH 9) for 16-24 hours at room temperature;

Dihydroxypropane—The lenses are treated with a 20% solution of dihydroxypropane and water and boiled for two hours; or Water—The lenses are treated with water and boiled for about 8 hours.

After treatment, all lenses are rinsed, boiled in water, and finally hydrated and stored in a saline solution. The water of hydration is shown in the above table.

While the present invention has been described with reference to the specific embodiments thereof, it should be understood by those skilled in this art that various changes may be made and equivalents may be substituted without departing from the true spirit and scope of the invention. In addition, many modifications may be made to adopt a particular situation, material, or composition of matter, process, process step or steps, or then present objective to the spirit of their invention without departing from its essential teachings.

What is claimed is:

1. A polymer formed by a free radical bulk polymerization of:
   (a) a first monomer of the formula:

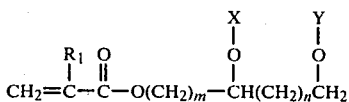

wherein:
   R$_1$ is hydrogen or methyl;
   m is an integer from 1 to 4; and
   n is an integer from 0 to 1;
   X and Y are protecting groups and are independently selected from the group consisting of:

(1) —C(O)OR$_2$
   wherein R$_2$ is an alkyl group containing from 1 to 8 carbon atoms;
   (2) hexahydropyranyl; and
   (3) where X and Y together form one protecting group selected from the group consisting of:
      (i) >B—R$_3$
      wherein:
      R$_3$ is a lower alkyl group containing 1 to 6 carbon atoms, cycloalkyl group containing 3 to 6 carbon atoms; and aryl selected from the group consisting of phenyl, tolyl and naphthyl; and
      (ii) >S=O (b) a second substantially water insoluble monomer of the formula:

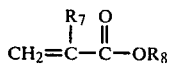

wherein:
   R$_7$ is hydrogen or methyl; and
   R$_8$ is lower alkyl having 1 to 6 carbon atoms or cycloalkyl having from 3 to 6 carbon atoms;
   the molar ratio of said first monomer to said second monomer being between about 1:30 and 20:1; and (c) optionally, a third substantially water insoluble monomer of the formula:

wherein:
   R$_9$ is hydrogen or methyl; and
   p is an integer from 1 to 6; or

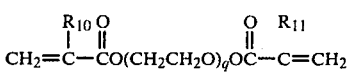

wherein:
   R$_{10}$ and R$_{11}$ are independently hydrogen or methyl, and
   q is an integer from 1 to 6;
   the concentration of said third monomer when present being between about 0 and 30 percent by weight of the first monomer;
   said protection group(s) being subsequently removable by chemical means after said bulk polymerization;

wherein said polymer can be handled, machined, and shaped over a wide humidity range as compared to a hydrogel polymer and can be polished and machined using water based and water-compatible oils, abrasives and polishes.

2. The polymer of claim 1 wherein:
   (a) said first and second monomers are present in a ratio of about 1:1 and 10:1; and
   (b) said third monomer is optionally present in about 1 to about 20 percent by weight of said first monomer.

3. The polymer of claims 1 or 2 wherein
   (a) with regard to said first monomer, R$_1$ is methyl, R$_3$ is butyl, and m is 1;
   (b) with regard to said second monomer, R$_7$ and R$_8$ are methyl; and (c) with regard to said third monomer, $R_9$ is methyl and p is 1.

4. A polymer formed by a free radical bulk polymerization of:

(a) a first monomer of the formula:

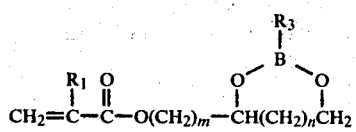

wherein:
$R_1$ is hydrogen or methyl;
$R_3$ is lower alkyl containing 1 to 6 carbon atoms or cycloalkyl having from 3 to 6 carbon atoms and aryl selected from the group consisting of phenyl, tolyl and naphthyl; and
m is an integer from 1 to 4;
n is an integer from 0 to 1;

(b) a second substantially water insoluble monomer of the formula:

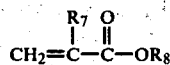

wherein:
$R_7$ is hydrogen or methyl; and
$R_8$ is lower alkyl having 1 to 6 carbon atoms or cycloalkyl having from 3 to 6 carbon atoms;
the molar ratio of said first monomer to said second monomer being between about 1:30 and 20:1; and (c) optionally a third substantially water insoluble monomer of the formula:

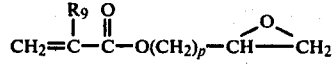

wherein:
$R_9$ is hydrogen or methyl; and
p is an integer from 1 to 6;
the concentration of said third monomer when present being between about 0.1 and 30 percent by weight of the first monomer;
wherein said polymer can be handled, machined, and shaped over a wide humidity range as compared to a hydrogel polymer and can be polished and machined using water-based and water compatible oils, abrasives and polishes.

5. The polymer of claim 4 wherein:
(a) said first and second monomers are present in a ratio between about 1:1 and 10:1; and
(b) said third monomer is optionally present between about 1 to 20 percent by weight of said first monomer.

6. The polymer of claims 4 or 5 wherein
(a) with regard to said first monomer, $R_1$ is methyl, $R_3$ is butyl and m is 1;
(b) with regard to said second monomer, $R_7$ and $R_8$ are methyl; and
(c) with regard to said third monomer, $R_9$ is methyl, and n is 1.

7. A polymer formed by a free radical bulk polymerization of:

(a) a first monomer of the formula:

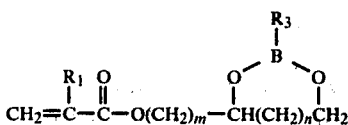

wherein:
$R_1$ is hydrogen or methyl;
$R_2$ is lower alkyl containing 1 to 6 carbon atoms; and
m is an integer from 1 to 4;
n is an integer from 0 to 1;

(b) a second substantially water insoluble monomer of the formula:

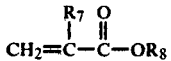

wherein:
$R_7$ is hydrogen or methyl; and
$R_8$ is lower alkyl having 1 to 6 carbon atoms or cycloalkyl having from 3 to 6 carbon atoms;
the molar ratio of said first monomer to said second monomer being between about 1:30 and 20:1; and (c) a third substantially water insoluble monomer of the formula:

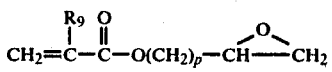

wherein:
$R_9$ is hydrogen or methyl; and
p is an integer from 1 to 6; the concentration of said third monomer being between about 0.001 and 30 percent by weight of the first monomer; said boron protecting group being subsequently removable by chemical means after said bulk polymerization.

8. The polymer of claim 7 wherein
(a) said first and monomers are present in a ratio between about 1:1 and 10:1; and
(b) said third monomer is optionally present between about 1 and 20 percent by weight of said first monomer.

9. The polymer of claims 7 or 8 wherein
(a) with regard to said first monomer, $R_1$ is methyl, $R_3$ is butyl, m is 1, n is 0;
(b) with regard to said second monomer, $R_7$ and $R_8$ are methyl; and
(c) with regard to said third monomer, $R_9$ is methyl, and p is 1.

10. A process for preparing a polymer which comprises:

(a) treating a monomer of the formula:

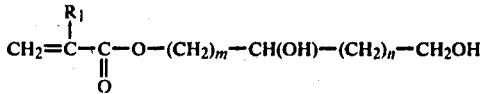

wherein:
$R_1$ is hydrogen or methyl; and
m is an integer from 0 to 6 or cycloalkyl containing from 3 to 6 carbon atoms;
n is an integer from 0 to 1;

with a boronic acid of the formula:

$R_3B(OH)_2$ wherein: $R_3$ is lower alkyl containing 1 to 6 carbon atoms or aryl selected from the group consisting of phenyl tolyl and naphthyl to form an adduct of the formula:

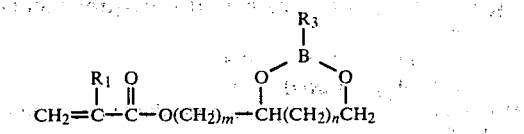

wherein B, $R_1$, $R_2$, m and n are defined above and

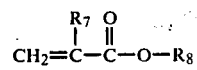

corresponds to a boron-containing protecting group;
(b) purifying said adduct using non-aqueous, non-hydroxylic organic solvents;
(c) mixing said purified adduct with a second monomer of the formula:

$$CH_2=\overset{R_7}{\underset{|}{C}}-\overset{O}{\underset{\|}{C}}-O-R_8$$

(d) optionally mixing said purified adduct and second monomer with a third monomer of the formula:

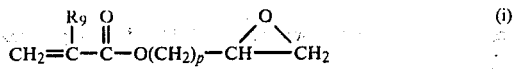

wherein:
$R_9$ is hydrogen or methyl; and
r is an integer from 1 to 6; or a third monomer of the formula:

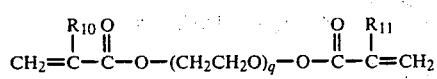

wherein:
$R_{10}$ and $R_{11}$ are independently hydrogen or methyl; and
q is an integer from 1 to 6;
(e) polymerizing by a free radical bulk polymerization process said mixture of said purified adduct and said monomer(s).

11. The process of claim 10 further including removing the boron-containing protecting groups and the regeneration of the hydroxyl groups.

12. The process of claim 11 wherein said removal includes treating said polymer with boiling water to remove the boron-containing protecting groups.

13. The process of claim 11 wherein said removal includes treating said polymer with water and polyhydroxyl alcohol to remove the boron-containing protecting group.

14. The process of claim 11 wherein said removal includes treating said polymer at room temperature with hydrogen peroxide in a buffer solution to remove the boron-containing protecting groups.

* * * * *